US008652995B2

(12) United States Patent
Gadkaree et al.

(10) Patent No.: US 8,652,995 B2
(45) Date of Patent: Feb. 18, 2014

(54) STEAM ACTIVATED NON-LIGNOCELLULOSIC BASED CARBONS FOR ULTRACAPACITORS

(75) Inventors: Kishor Purushottam Gadkaree, Painted Post, NY (US); Andrew Fleitz Husted, Wellsburg, NY (US); Jia Liu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 252 days.

(21) Appl. No.: 13/185,842

(22) Filed: Jul. 19, 2011

(65) Prior Publication Data

US 2013/0022532 A1    Jan. 24, 2013

(51) Int. Cl.
*C01B 31/10* (2006.01)
(52) U.S. Cl.
USPC .......................................... 502/432; 502/437
(58) Field of Classification Search
USPC ................................................ 502/432, 437
See application file for complete search history.

(56) References Cited

U.S. PATENT DOCUMENTS

| | | | |
|---|---|---|---|
| 5,039,651 A | | 8/1991 | Kosaka et al. |
| 5,597,617 A * | | 1/1997 | DeLiso et al. ................ 427/228 |
| 5,883,040 A * | | 3/1999 | Armstrong et al. ........... 502/437 |
| 8,318,356 B2 * | | 11/2012 | Gadkaree et al. ......... 429/231.8 |
| 8,405,955 B2 * | | 3/2013 | Gadkaree et al. ............. 361/502 |
| 2002/0036883 A1 | | 3/2002 | Noguchi et al. |
| 2010/0151328 A1 | | 6/2010 | Gadkaree et al. |

FOREIGN PATENT DOCUMENTS

| | | |
|---|---|---|
| CN | 101780952 | 7/2010 |
| EP | 0467486 | 7/1991 |
| EP | 2031612 | 5/2007 |
| WO | 2011090993 | 7/2011 |
| WO | 2011149807 | 12/2011 |

OTHER PUBLICATIONS

Pandolfo, A. G.; Hollenkamp, A. F., Carbon properties and their role in supercapacitors. *Journal of Power Sources* 2006, 157, 11-27.
Ahmadpour, A.; Do, D. D., The Preparation of Active Carbons From Coal by Chemical and Physical Activation. *Carbon* 1996, 34, (4), 471-479.
Illan-Gomez, M. J.; Garcia-Garcia, A.; de Lecea, C. S.-M.; Linares-Solano, A., Activated Carbons from Spanish Coals. 2. Chemical Activation. *Energy & Fuels* 1996, 10, 1108-14.
Ahmadpour, A.; Do, D. D., The preparation of activated carbon from macadamia nutshell by chemical activation. *Carbon* 1997, 35, (12), 1723-1732.
Kadlec, O.; Varhanikova, A.; Zukal, A., Structure of pores of active carbons prepared by water-vapour and zinc-dichloride activation. *Carbon* 1970, 8, 321-331.
Treusch, O.; Hofenauer, A.; Troger, F.; Fromm, J.; Wegener, G., Basic properties of specific wood-based materials carbonised in a nitrogen atmosphere. *Wood Sci Technol* 2004, 38, 323-333.
Cadek, M.; Oettinger, O.; Wachtler, M.; Raymundo-Pifiero, E.; Béguin, F., Bio-Based Materials for Supercapacitor. In *Carbon 2007*, Seattle, WA, 2007.
Tennison, S. R., Phenolic-resin-derived activated carbons. *Applied Catalysis A: General* 1998, 173, 289-311.
Yue, Z.; Mangun, C. L.; Economy, J., Preparation of fibrous porous materials by chemical activation 1. ZnCl2 activation of polymer-coated fibers. *Carbon* 2002, 40, 1181-81.
Teng, H.; Wang, S.-C., Preparation of porous carbons from phenol—formaldehyde resins with chemical and physical activation. *Carbon* 2000, 38, 817-824.
Yue, Z.; Economy, J.; Mangun, C. L., Preparation of fibrous porous materials by chemical activation 2. H3PO4 activation of polymer coated fibers. *Carbon* 2003, 41, 1809-17.
Inagaki M.; Konno H.,; Tanaike O., ; Carbon Materials for Electrochemical Capacitors. *Journal of Power Sources* 195(2010) 7880-7903.
Machine Translation of CN101780952.
PCT/US2012/043923 Search Report.

\* cited by examiner

*Primary Examiner* — Stuart Hendrickson
(74) *Attorney, Agent, or Firm* — Michael W. Russell

(57) ABSTRACT

A method for producing an activated carbon material includes heating a non-lignocellulosic carbon precursor to form a carbon material and reacting the carbon material with steam to form an activated carbon material. The activated carbon material is suitable to form improved carbon-based electrodes for use in high energy density devices.

18 Claims, 3 Drawing Sheets

STEAM ACTIVATED NON-LIGNOCELLULOSIC BASED CARBONS FOR ULTRACAPACITORS

BACKGROUND

The present disclosure relates to carbon-based electrodes and, more specifically, to steam-activated carbon and related methods for preparing steam-activated carbon for use in making such electrodes. The disclosure also relates to high power density energy storage devices comprising carbon-based electrodes.

An ultracapacitor, also known as a double-layer capacitor, polarizes an electrolytic solution to store energy electrostatically. Though it is an electrochemical device, no chemical reactions are typically involved in the energy storage mechanism. The mechanism is reversible, which allows the ultracapacitor to be charged and discharged many times.

Ultracapacitors typically comprise two porous electrodes that are isolated from electrical contact with each other by a porous dielectric separator. The separator and the electrodes are impregnated with an electrolytic solution, which allows ionic current to flow between the electrodes while preventing electric current from discharging the cell. Each electrode is typically in electrical contact with a current collector. The current collector, which can comprise a sheet or plate of electrically-conductive material (e.g., aluminum) can reduce ohmic losses while providing physical support for the porous electrode material.

Within an individual ultracapacitor cell, and under the influence of an applied electric potential, an ionic current flows due to the attraction of anions in the electrolyte to the positive electrode and cations to the negative electrode. Ionic charge can accumulate at each of the electrode surfaces to create charge layers at the solid-liquid interfaces. The accumulated charge is held at the respective interfaces by opposite charges in the solid electrode to generate an electrode potential. Generally, the potential increases as a linear function of the quantity of charged species (ions and radicals) stored at or on the electrodes.

During discharge of the cell, a potential across the electrodes causes ionic current to flow as anions are discharged from the surface of the positive electrode and cations are discharged from the surface of the negative electrode. Simultaneously, an electronic current can flow through an external circuit located between the current collectors. The external circuit can be used to power electrical devices.

The electrolyte serves as a promoter of ion conductivity, as a source of ions, and may serve as a binder for the carbon. The electrolyte typically comprises a salt dissolved in a suitable solvent. Suitable electrolyte salts include quaternary ammonium salts such as those disclosed in commonly-owned U.S. patent application Ser. No. 13/011,066, the disclosure of which is incorporated herein by reference in its entirety. An example quaternary ammonium salt is tetraethylammonium tetraflouroborate ($(Et)_4NBF_4$). An example solvent is acetonitrile.

Energy storage devices such as ultracapacitors may be used in a variety of applications, such as those where a discrete power pulse is required. Example applications range from cell phones to hybrid vehicles. An important characteristic of an ultracapacitor is the energy density that it can provide. It has been demonstrated that the energy density of the device is largely determined by the properties of the carbon-based electrodes.

Carbon-based electrodes suitable for incorporation into high energy density devices are known. For example, high performance carbon materials, which form the basis of such electrodes, can be made via chemical activation of synthetic phenolic resin precursors. However, due to the relatively high costs of both the chemical activating agents and the synthetic resins, the cost of such activated carbon material and the resulting carbon-based electrodes can be high. Further, chemical activating agent may contribute unwanted impurities to the resulting activated carbon. Accordingly, it would be an advantage to provide a more economical process for preparing activated carbon material, which can be used to form carbon-based electrodes that enable higher energy density devices.

SUMMARY

According to one embodiment, activated carbon material that is suitable for incorporation into carbon-based electrodes for use in ultracapacitors and other high power density energy storage devices is derived via steam activation from natural non-lignocellulosic materials. By using non-lignocellulosic materials as a precursor for the activated carbon material, economically viable, high power, high energy density devices can be formed. Compared to chemically-activated carbon materials, the steam-activated carbon described in the present disclosure may provide as much as a 50% reduction in cost.

Activated carbon can be prepared by heating a non-lignocellulosic carbon precursor at a carbonization temperature effective to form a carbon material, and reacting the carbon material with steam at an activation temperature effective to form an activated carbon.

Additional features and advantages of the disclosure will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

DETAILED DESCRIPTION

Figure 1:
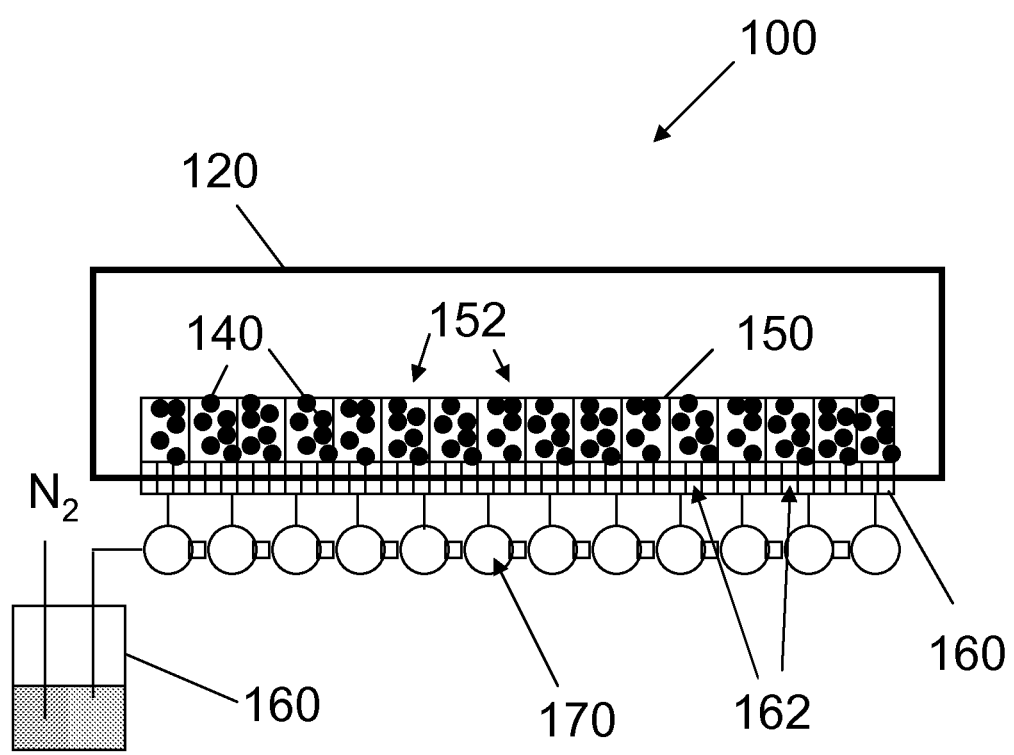
FIG. 1 is an example apparatus for forming steam-activated carbon.

A method for producing an activated carbon material comprises heating a non-lignocellulosic carbon precursor at a carbonization temperature effective to form a carbon material, and reacting the carbon material with steam at an activation temperature effective to form an activated carbon material.

The activated carbon materials formed according to the disclosed methods are suitable to form carbon-based electrodes for use in high energy density devices. Advantageously, ultracapacitors made using the inventive carbon-based electrodes may exhibit energy densities that are more than twice the energy densities of ultracapacitors made using electrodes derived from commercially-available carbon.

The carbon precursor is a natural non-lignocellulosic material. As defined herein, a substance that contains both cellulose and lignin is lignocellulosic and, for example, can include any of several closely-related substances constituting the essential part of woody cell walls of plants having cellulose intimately associated with lignin. The non-lignocellulosic carbon precursors used in conjunction with the present disclosure are substantially free of at least one of lignin and cellulose. By substantially free is meant that at least one of the lignin and cellulose comprise, for example, at most 0.5, 1 or 2 wt. % of the composition of the carbon precursor.

In one embodiment, the natural non-lignocellulosic carbon precursor contains cellulose and is substantially free of lignin. In a further embodiment, the natural non-lignocellulosic carbon precursor contains lignin but is substantially free of cellulose. In a still further embodiment, the natural non-lignocellulosic carbon precursor is substantially free of both lignin and cellulose. The natural, non-lignocellulosic carbon precursor is not a synthetic material such as a synthetic resin. As used herein, unless expressly defined otherwise, "a non-lignocellulosic carbon precursor" means at least one non-lignocellulosic carbon precursor.

Lignin, which is a Latin word for wood, is a compound that imparts rigidity to a plant. Lignin is a three-dimensional polymer having an amorphous structure and a high molecular weight. Of the three main constituents in plant fibers, lignin has the least affinity for water. In addition, lignin is a thermoplastic (i.e., lignin starts to soften at relatively low temperature and, with increasing temperature, will flow readily).

Cellulose is a basic structural component of plant fibers. Cellulose molecules can comprise, e.g., glucose units that are linked together in long chains, which in turn are linked together in bundles called microfibrils. Hemicelluloses are also found in plant fibers. Hemicelluloses are typically polysaccharides bonded together in relatively short, branching chains. Hemicelluloses, which are usually hydrophilic, are usually intimately associated with the cellulose microfibrils, embedding the cellulose in a matrix.

Typical lignocellulosic fibers from agriculture are found, for example, in straws, hemp, flax, sisal, and jute. On the other hand, non-lignocellulosic fibers are substantially free of lignin and/or cellulose.

The natural, non-lignocellulosic carbon precursor can be derived from an edible grain such as wheat flour, walnut flour, corn flour, corn starch, corn meal, rice flour, and potato flour. Other natural, non-lignocellulosic carbon precursors include beets, millet, soybean, barley, and cotton. The non-lignocellulosic material can be derived from a crop or plant that may or may not be genetically-engineered.

An exemplary non-lignocellulosic carbon precursor is wheat flour. Wheat flour is derived by milling wheat kernels, which are the seeds of the wheat plant. Wheat kernels have three main parts: the endosperm, the germ, and the bran. Whole wheat flour contains all three parts of the kernel, while white flour is milled from just the endosperm.

Compositionally, white flour contains mostly starch, although additional components are naturally present. The main components in white flour, with approximate percentages provided in parentheses, are starch (68-76%), proteins (6-18%), moisture (11-14%), gums (2-3%), lipids (1-1.5%), ash (<0.5%) and sugars (<0.5%).

Starch makes up the bulk of white flour. Even bread flour, considered "low" in starch, contains more starch than all other components combined. Starch is typically present in flour as small grains or granules. Chunks of protein bind starch granules together and hold them in place within the endosperm. Glutenin and gliadin, the gluten-forming proteins, typicall make up about 80 percent of the proteins in the endosperm. Other proteins in white flour include enzymes, such as amylase, protease, and lipase. Other carbohydrates in flour besides starch include gums, specifically pentosan gums. Pentosan gums are a source of soluble dietary fiber. Lipids include oils and emulsifiers, and ash includes inorganic matter (mineral salts), which can comprise iron, copper, potassium, sodium, and zinc.

The non-lignocellulosic carbon precursor can be carbonized in an inert or reducing atmosphere. As an example, a non-lignocellulosic carbon precursor can be heated at a temperature from about 600° C. to 800° C. (e.g., 600, 650, 700, 750 or 800° C.) for a predetermined time (e.g., 0.5, 1, 2, 4, 8 or more hours) and then optionally cooled. During carbonization, the non-lignocellulosic carbon precursor decomposes and forms carbon.

The carbon material formed via carbonization can be activated by exposure to steam. As used herein, activation refers to the process of heating carbonized or pyrolyzed material at an activation temperature during exposure to a steam-containing atmosphere to produce an activated carbon material. The activation process generally removes a given volume of surface material from the material being treated, resulting in an increased surface area. In example methods, the carbon material is ground prior to reacting with steam. In various embodiments, the activation temperature can range from about 700° C. to 1100° C.

In one embodiment, the steam activation process can be done under a controlled atmosphere using a rotary kiln. In a further embodiment, the steam activation process can be performed by incorporating the carbon material into plural channels of a honeycomb substrate and then flowing steam through the channels and over the carbon material.

Figure 4:
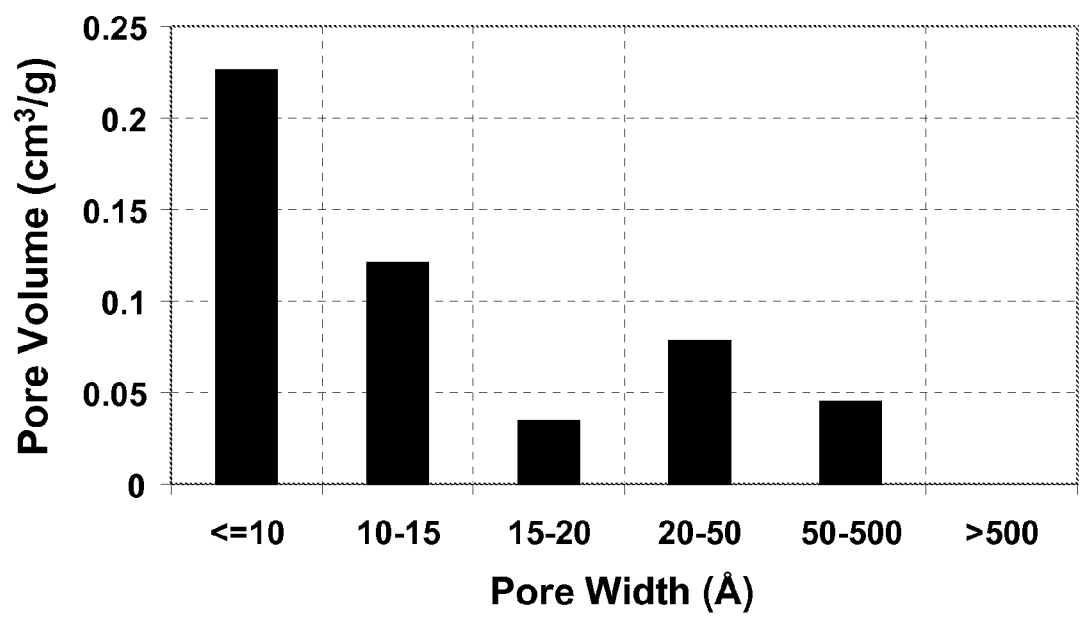
FIG. 4 is a pore size distribution histogram of an activated carbon material according to a still further embodiment.

The foregoing approach is illustrated schematically in FIG. 4, which shows an example apparatus 100 for forming steam-activated carbon. Apparatus 100 includes a furnace 120 and a water source 160 adapted to provide a flow of water via manifold 170 into furnace 120. Located within the furnace is a honeycomb substrate 150 comprising a plurality of honeycomb channels 152. Incorporated into the honeycomb channels 152 is carbon material 140. In the illustrated embodiment, honeycomb substrate 150 rests atop a second honeycomb substrate 160 having a plurality of honeycomb channels 162 that are smaller in size than channels 152 in honeycomb substrate 150, and which keep the carbon material 140 from falling through the honeycomb channels 152.

In operation, water entrained in flowing nitrogen is introduced from water source 160 via manifold 170 through the channels 162, 152 of the respective honeycomb substrates 160, 150 where it vaporizes to form steam and flows over and reacts with the carbon material 140 to form activated carbon.

In various embodiments, the honeycomb substrate 150 can comprise 50 channels per square inch, while the underlying honeycomb substrate 160 can comprise 100 channels per square inch. Of course, a skilled artisan can configure the respective substrates to suitably contain the carbon material 140 to be activated. In an example process, a nitrogen flow rate of about 40 liters/minute was used to deliver water entrained in flowing nitrogen to a honeycomb substrate 150 having overall dimensions of 6×6×0.5 inch (L×W×D) where approximately 40-50 grams of carbon material was incorporated into the plurality of channels 152. In order to promote uniform flow of steam through the honeycomb substrates, the carbon material 140 can be evenly distributed among the various channels 152. After reacting the carbon material with steam within the furnace 120, the furnace can be cooled and the activated carbon optionally processed further.

The resulting activated carbon can be washed, e.g., with an acidic solution. The washing can reduce the ash content and remove unwanted impurities from the activated carbon. One process for washing the activated carbon involves sequentially rinsing the activated carbon with water and acid. A further washing process involves rinsing the activated carbon with an aqueous acid mixture (e.g., mixture of acid and water). Acids used during the washing can include hydrochloric acid and sulfuric acid.

In further embodiments, the activated carbon can be heated treated in an inert or reducing atmosphere. The optional heat treatment can eliminate or lessen the concentration of oxygen in the activated carbon. For example, such a heat treatment can remove oxygen-containing functional groups from the activated carbon surface. In embodiments, the activated carbon can be treated with both a washing step and a heat treatment, and where both processes are performed, the washing step may be performed either before or after the heat treatment.

The activated carbon can comprise micro-, meso- and/or macroscale porosity. As defined herein, microscale pores have a pore size of 2 nm or less. Mesoscale pores have a pore size ranging from 2 to 50 nm. Macroscale pores have a pore size greater than 50 nm. In an embodiment, the activated carbon comprises a majority of microscale pores. As used herein, the term "microporous carbon" and variants thereof means an activated carbon having a majority (i.e., at least 50%) of microscale pores. A microporous, activated carbon material can comprise greater than 50% microporosity (e.g., greater than 50, 55, 60, 65, 70, 75, 80, 85, 90 or 95% microporosity).

According to embodiments, a carbon-based electrode for an EDLC comprises activated carbon having a total porosity greater than about 0.2 cm$^3$/g (e.g., greater than 0.2, 0.25, 0.3, 0.35, 0.4, 0.45, 0.5, 0.55, 0.6, 0.65 or 0.7 cm$^3$/g).

The pore size distribution of the activated carbon can include ultramicropores, micropores, mesopores and macropores and may be characterized as having a unimodal, bimodal or multi-modal pore size distribution. The ultramicropores can comprise 0.2 cm$^3$/g or more (e.g., 0.2, 0.25, 0.3, 0.35 or 0.4 cm$^3$/g or more) of the total pore volume. Pores having a pore size (d) in the range of 1<d≤2 nm can comprise 0.05 cm$^3$/g or more (e.g., at least 0.1, 0.15, 0.2 or 0.25 cm$^3$/g) of the total pore volume. If present, in an embodiment, any pores having a pore size greater than 2 nm, which may include mesopores and/or macropores, can comprise 0.15 cm$^3$/g or less (e.g., less than 0.1 or 0.05 cm$^3$/g) of the total pore volume.

The activated carbon made using the inventive method can have a specific surface area greater than about 300 m$^2$/g, i.e., greater than 350, 400, 500 or 1000 m$^2$/g.

A method for producing a carbon-based electrode comprises heating a non-lignocellulosic carbon precursor at a carbonization temperature effective to form a carbon material, reacting the carbon material with steam at an activation temperature effective to form an activated carbon material, and forming a carbon-based electrode from the resulting activated carbon. Prior to forming a carbon-based electrode, the activated carbon material may be dried to form a powder, which can then be incorporated into the electrode-making process.

Optionally, in conjunction with the foregoing methods for producing a carbon-based electrode, the activated carbon can be mixed with carbon black and/or a polymeric binder such as polytetrafluroethylene (PTFE) or other suitable binder and compacted to form the carbon-based electrode.

By way of example, a carbon paper having a thickness in the range of about 100-300 microns can be prepared by rolling and pressing a powder mixture comprising 60-90 wt. % activated carbon, 5-20 wt. % carbon black and 5-20 wt. % PTFE. Carbon sheets can be stamped or otherwise patterned from the carbon paper and laminated to a conductive current collector to form a carbon-based electrode.

The high energy density device can include an ultracapacitor. Ultracapacitors can have a jelly roll design, prismatic design, honeycomb design, or other suitable configuration. A carbon-based electrode made according to the present disclosure can be incorporated into a carbon-carbon ultracapacitor or into a hybrid ultracapacitor. In a carbon-carbon ultracapacitor, both of the electrodes are carbon-based electrodes. In a hybrid ultracapacitor, on the other hand, one of the electrodes is carbon-based, and the other electrode can be a pseudo capacitive material such as lead oxide, ruthenium oxide, nickel hydroxide, or another material such as a conductive polymer (e.g., parafluorophenyl-thiophene).

EXAMPLES

The invention will be further clarified by the following examples.

Example 1

Figure 2:
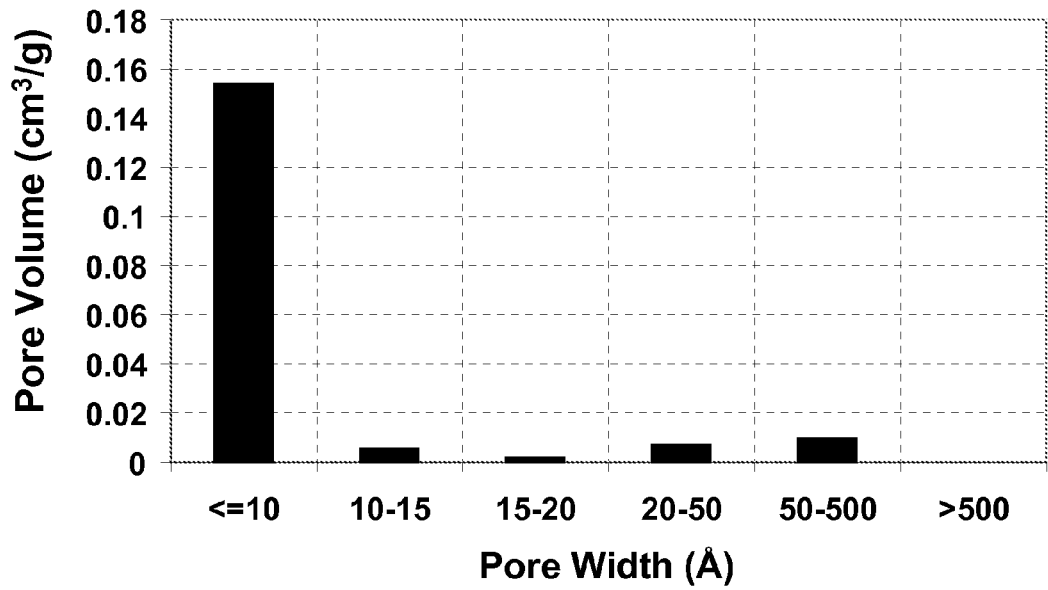
FIG. 2 is a pore size distribution histogram of an activated carbon material according to one embodiment.

Wheat flour was first carbonized in flowing nitrogen at 700° C. for 2 hours. The resulting cabon material was exposed to a source of steam at 700° C. for 2 hours to form activated carbon. Following the steam activation, the activated carbon was heat treated in forming gas at 675° C. for 2 hours. The activated carbon was dried and ground to a fine powder (~10 micrometers). The pore size distribution of this activated carbon is shown in FIG. 2. The total pore volume of the activated carbon was 0.177 cm$^3$/g and the BET surface area was 493 m$^2$/g.

Eighty five grams of the activated carbon was mixed with 5 grams of carbon black and 10 grams of PTFE to obtain a well-mixed mass. Isopropyl alcohol was added to promote the mixing. The mixture was dried and rolled on a roll mill to obtain a well-knit film having a thickness of about ~100 micrometers. The resulting film was dried overnight at 120° C.

Button cells were fabricated using the free-standing carbon films. An electrode/separator/electrode stack was assembled into a button cell with opposing platinum foil current collectors. Cellulose paper was used as the separator. The carbon-based electrodes and the separator were soaked in 1.5 M tetraethylammonium-tetrafluoroborate (TEA-TFB) in acetonitrile. An extra drop of electrolyte was added to each cell after placing the second carbon electrode but prior to placing the second current collector. In turn, each cell was sealed using a thermoset sealant. Standard voltametric as well galvanostatic tests were carried out to measure the performance of the cell. The volumetric capacitance of the activated carbon electrode in the present example was 19.5 F/cm$^3$.

Example 2

Figure 3:
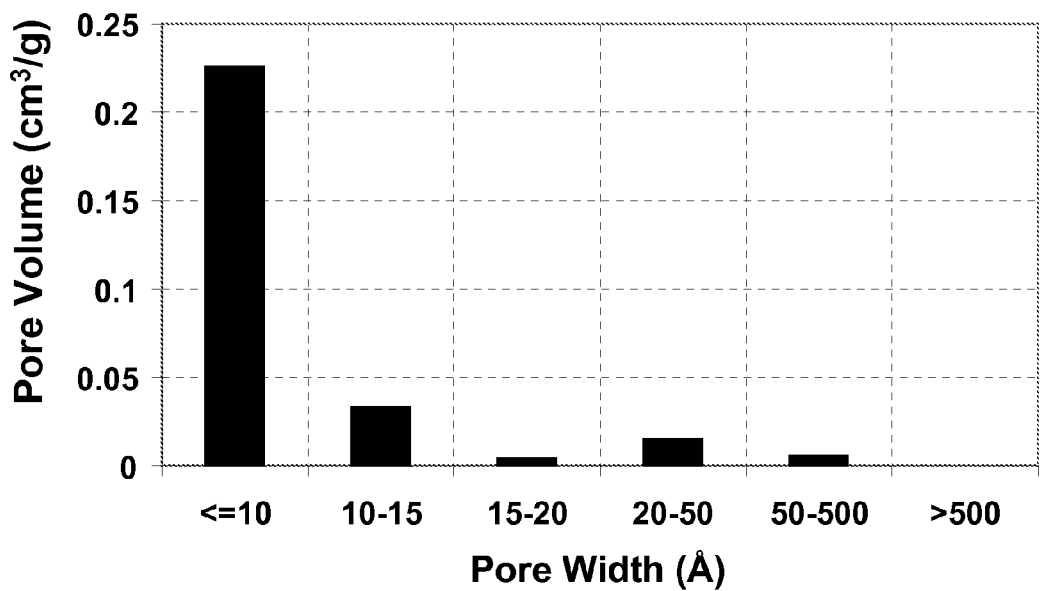
FIG. 3 is a pore size distribution histogram of an activated carbon material according to a further embodiment.

The experiment of Example 1 was repeated, except the steam activation temperature was increased from 700° C. to 800° C. The pore size distribution of this activated carbon is shown in FIG. 3. The total pore volume of the activated carbon was 0.284 cm$^3$/g and the BET surface area was 822 m$^2$/g. The volumetric capacitance of the activated carbon electrode was 53 F/cm$^3$.

Example 3

The experiment of Example 1 was again repeated, except the steam activation temperature was increased from 700° C. to 800° C., and the steam exposure time was increased from 2 hours to 4 hours. In addition, following the steam activation, the activated carbon was heat treated in forming gas at 800° C. for 2 hours. The pore size distribution of the resulting activated carbon is shown in FIG. 4. The total pore volume of the activated carbon was 0.504 cm$^3$/g and the BET surface area was 1269 m$^2$/g. The volumetric capacitance of the activated carbon electrode was 71 F/cm$^3$. The data suggest that good energy storage capacity can be achieved from activated carbon having at least 0.15 cm$^3$/g in total pore volume contributed by pores smaller than 10 Angstroms.

Example 4

The experiment of Example 3 was repeated, except the steam activation time was increased from 4 hours to 6 hours. The resulting volumetric capacitance was 70 F/cm$^3$.

Example 5

The experiment of Example 3 was again repeated, except the steam activation temperature was increased from 800° C. to 850° C. The resulting volumetric capacitance was 69 F/cm$^3$.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for producing an activated carbon material comprising:
   heating a non-lignocellulosic carbon precursor at a carbonization temperature effective to form a carbon material; and
   reacting the carbon material with steam at an activation temperature effective to form an activated carbon material, wherein the reacting comprises incorporating the carbon material into one or more channels of a honeycomb substrate and flowing steam down the carbon-containing channels.

2. A method according to claim 1, wherein the non-lignocellulosic carbon precursor is selected from the group consisting of wheat flour, walnut flour, corn flour, corn starch, corn meal, rice flour, potato flour, beets, millet, soybean, barley and cotton.

3. The method according to claim 1, wherein the carbonization temperature ranges from about 600° C. to 800° C.

4. The method according to claim 1, wherein the heating is performed in an inert atmosphere.

5. The method according to claim 1, wherein the heating is performed in a nitrogen atmosphere.

6. The method according to claim 1, wherein the activation temperature ranges from about 700° C. to 1000° C.

7. The method according to claim 1, wherein the carbon material is reacted with steam for a period of time ranging from about 0.5 to 5 hours.

8. The method according to claim 1, wherein the activated carbon material comprises:
   pores having a size of ≤1 nm, which provide a combined pore volume of ≥0.3 cm$^3$/g;
   pores having a size of from >1 nm to ≤2 nm, which provide a combined pore volume of ≥0.05 cm$^3$/g; and
   <0.15 cm$^3$/g combined pore volume of any pores having a size of >2 nm.

9. The method according to claim 1, wherein the activated carbon material comprises:
   pores having a size of ≤1 nm, which provide a combined pore volume of ≥0.2 cm$^3$/g; and
   pores having a size of from >1 nm to ≤2 nm, which provide a combined pore volume of ≥0.1 cm$^3$/g.

10. The method according to claim 1, further comprising washing the activated carbon material in an acidic solution.

11. The method according to claim 1, further comprising heating the activated carbon material in an inert or reducing atmosphere.

12. The method according to claim 1, further comprising grinding the carbon material prior to reacting the carbon material with steam.

13. A method for producing a carbon-based electrode comprising:
   heating a non-lignocellulosic carbon precursor at a temperature effective to form a carbon material;
   reacting the carbon material with steam to form an activated carbon material; and
   forming a carbon-based electrode from the activated carbon material, wherein the reacting comprises incorporating the carbon material into one or more channels of a honeycomb substrate and flowing steam down the carbon-containing channels.

14. A method according to claim 13, wherein the activated carbon material is dried to form a powder prior to forming the carbon-based electrode.

15. A method according to claim 13, wherein the step of forming the carbon-based electrode comprises mixing the activated carbon material with at least one or carbon black and PTFE.

16. A method according to claim 13, further comprising incorporating the carbon-based electrode into a energy storage device.

17. A method according to claim 16, wherein the energy storage device is an ultracapacitor.

18. A method according to claim 17, wherein the ultracapacitor has a design selected from the group consisting of a jelly roll design, a prismatic design, and a honeycomb design.

* * * * *